United States Patent
Koleshwar et al.

(10) Patent No.: US 11,161,058 B2
(45) Date of Patent: Nov. 2, 2021

(54) FLUID SEPARATION SYSTEMS FOR OIL AND GAS APPLICATIONS

(71) Applicant: Saudi Arabian Oil Company, Dhahran (SA)

(72) Inventors: Vilas S. Koleshwar, Dhahran (SA); Saif F. AlBluwi, Al-Khobar (SA); Olanrewaju Malcolm Oshinowo, Dhahran (SA); Maher Maqbool Shariff, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 7 days.

(21) Appl. No.: 16/731,659

(22) Filed: Dec. 31, 2019

(65) Prior Publication Data
US 2021/0197100 A1 Jul. 1, 2021

(51) Int. Cl.
*B01D 17/04* (2006.01)
*B01D 17/02* (2006.01)
*B01D 19/00* (2006.01)

(52) U.S. Cl.
CPC ........ *B01D 17/045* (2013.01); *B01D 17/0211* (2013.01); *B01D 19/0042* (2013.01); *B01D 2221/04* (2013.01); *B01D 2257/80* (2013.01)

(58) Field of Classification Search
CPC .............. B01D 17/045; B01D 17/0211; B01D 2257/80; B01D 2221/04; B01D 19/0042; B01D 21/00; B01D 19/00
(Continued)

(56) References Cited

U.S. PATENT DOCUMENTS

| 4,308,136 A | 12/1981 | Warne, Jr. |
| 4,539,023 A * | 9/1985 | Boley ............... B01D 1/305 |
| | | 96/184 |

(Continued)

FOREIGN PATENT DOCUMENTS

| DE | 19852204 A1 * | 5/2000 | ............ B01D 17/00 |
| DE | 10118443 A1 * | 10/2002 | ............ B01D 17/10 |

(Continued)

OTHER PUBLICATIONS

Trofaier et al., "Optimizing Separation Efficiency of Produced Water Tanks by Installing CFD Designed Internals," SPE-174937-MS, Presented at the SPE Annual Technical Conference and Exhibition, Houston, TX, Sep. 28-30, 2015; Society of Petroleum Engineers, 2015, 11 pages.

(Continued)

*Primary Examiner* — Nam X Nguyen
*Assistant Examiner* — Ekandra S. Miller-Cruz
(74) *Attorney, Agent, or Firm* — Fish & Richardson P.C.

(57) ABSTRACT

A fluid separation system for separating fluids within a container includes an inlet pipe arranged within the container to receive an incoming fluid stream including first, second, and third fluids. The fluid separation system further includes a fluid distribution device coupled to the inlet pipe and including first and second distribution components for respectively separating the incoming fluid stream into first internal fluid streams and second internal fluid streams within the container. The first and second internal fluid streams each include the first, second, and third fluids. The fluid separation system further includes one or more walls arranged to guide the first and second internal fluid streams towards an outlet of the container. The fluid distribution device and the one or more walls together cause the first, second, and third fluids of the first and second internal fluid (Continued)

streams to separate from one another other upstream of the outlet.

17 Claims, 11 Drawing Sheets
(2 of 11 Drawing Sheet(s) Filed in Color)

(58) Field of Classification Search
USPC ....... 210/188, 519, 521, 539, 708, 801, 802, 210/804; 95/253; 96/182, 183, 184
See application file for complete search history.

(56) References Cited

U.S. PATENT DOCUMENTS

| | | | |
|---|---|---|---|
| 4,596,586 A | 6/1986 | Davies et al. | |
| 6,537,458 B1 | 3/2003 | Polderman | |
| 6,843,832 B2 | 1/2005 | Greene et al. | |
| 8,142,666 B1* | 3/2012 | Happel | B01D 21/003 |
| | | | 210/747.2 |
| 8,337,603 B2 | 12/2012 | Akhras et al. | |
| 8,470,080 B1* | 6/2013 | Ball, IV | B01D 21/2405 |
| | | | 95/253 |
| 9,011,559 B2* | 4/2015 | Corry | C10K 1/02 |
| | | | 48/61 |
| 9,039,811 B2* | 5/2015 | Eisinger | B01D 45/12 |
| | | | 95/271 |
| 9,833,727 B1 | 12/2017 | Ball, IV | |
| 2007/0277967 A1 | 12/2007 | Oserod | |
| 2010/0282694 A1 | 11/2010 | Menchaca Lobato | |

FOREIGN PATENT DOCUMENTS

| | | | |
|---|---|---|---|
| EP | 0067300 A2 * | 12/1982 | ............. B01D 17/04 |
| EP | 0616823 A1 * | 9/1994 | ......... B01D 17/0208 |
| GB | 1119699 A * | 7/1968 | ............. B01D 3/008 |
| WO | WO 0024493 | 5/2000 | |

OTHER PUBLICATIONS

PCT International Search Report and Written Opinion in International Appln. No. PCT/US2020/066495, dated Feb. 26, 2021, 15 pages.

\* cited by examiner

Velocity Contours

Streamlines

FLUID SEPARATION SYSTEMS FOR OIL AND GAS APPLICATIONS

TECHNICAL FIELD

This disclosure relates to fluid separation systems, such as internal tank structures for separating wet crude oil into oil, water, and gas to produce high quality crude oil at production facilities.

BACKGROUND

At production facilities, a three-phase fluid mixture including crude oil, water, and gas is passed through a series of gas-liquid separators (for example, two-phase and three-phase separators) in order to yield crude oil that meets certain quality standards for water and gas contents. In some implementations, a separator in the series functions to separate water and gas from the crude oil mixture. Such a separator is typically provided as a tank that is equipped with a horizontal feed pipe that receives the fluid mixture near a bottom wall of the tank. The feed pipe is known as an inlet distributor and is fitted with multiple vertical riser pipes that release separated gas to a gas region within the tank. The feed pipe often suffers from vibrations and fatigue failures due to slug flow of the fluid mixture within the feed pipe, poor water separation efficiency, short-circuiting of the fluid mixture to the outlet, and intermixing of the oil and water phases of the fluid mixture. These performance limitations lead to water carryover in the crude oil and oil carryunder in the water produced at the tank and may necessitate installation and operation of additional downstream processing equipment so that the quality of the crude oil and the water produced meets the design requirements of further downstream equipment.

SUMMARY

This disclosure relates to an internal structure of a low pressure degassing tank for separating water and gas from crude oil to produce high quality crude oil at production facilities. The structure is arranged within a cylindrical volume of the tank and includes an inlet pipe that extends from an inlet nozzle of the tank, a twinned inlet distributor device (TIDD) disposed at an end of the inlet pipe, and multiple baffles arranged in a staggered pattern within the cylindrical volume.

The TIDD is designed to improve gas-liquid and liquid-liquid separation within the tank by separating a feed flow of the crude oil, water, and gas into multiple streams that disengage the bulk of the gas and directs the liquids in a spread out, decelerated manner such that paths traversed by the streams to oil and water outlets of the tank are maximized to achieve more uniform residence times of water and oil phases within the tank. The TIDD includes two adjacent distributor components that enable a split flow towards opposite sides of the tank. The TIDD is oriented perpendicular to the inlet pipe such that the feed stream undergoes a change in flow direction within the tank that helps to separate gas from liquid and water from oil in the feed stream.

The baffles, arranged in the staggered pattern, create a serpentine flow pattern across the tank that minimizes the variance in the residence time of the oil phase and the water phase within the tank. In addition to minimizing the variance in the residence time, the staggered pattern of the baffles also minimizes larger pockets of eddies in the flow path, minimizes fluid flow dead zones within the cylindrical volume of the tank, minimizes shearing of droplets, prevents intermixing of phases, and helps to coalesce droplets of the dispersed phases (for example, oil-in-water and water-in-oil) for better separation.

In one aspect, a fluid separation system for separating fluids within a container includes an inlet pipe arranged within the container to receive an incoming fluid stream including a first fluid, a second fluid, and a third fluid. The fluid separation system further includes a fluid distribution device coupled to the inlet pipe and including first and second distribution components for respectively separating the incoming fluid stream into first internal fluid streams and second internal fluid streams within the container, the first internal fluid streams and the second internal fluid streams each including the first fluid, the second fluid, and the third fluid. The fluid separation system further includes one or more walls arranged to guide the first internal fluid streams and the second internal fluid streams towards an outlet of the container. The fluid distribution device and the one or more walls together cause the first fluid, the second fluid, and the third fluid of the first internal fluid streams and second internal fluid streams to separate from one another other upstream of the outlet.

Embodiments may provide one or more of the following features.

In some embodiments, the first and second distribution components respectively have first and second structural configurations that are mirrored with respect to each other.

In some embodiments, the first distribution component includes multiple first fins that guide the first internal fluid streams in a first bulk direction, and the second distribution component includes multiple second fins that guide the second internal fluid streams in a second bulk direction that is opposite the first bulk direction.

In some embodiments, the fluid distribution device is a twinned inlet distributor device.

In some embodiments, the fluid distribution device is oriented perpendicular to the inlet pipe.

In some embodiments, the one or more walls include multiple walls that are positioned in a staggered arrangement to produce a serpentine flow path along which the first internal fluid streams and second internal fluid streams can flow towards the outlet of the container.

In some embodiments, the one or more walls extend from a lateral wall of the container to an interior region within the container.

In some embodiments, the fluid separation system further includes one or more flow turning devices respectively coupled to one or more free ends of the one or more walls.

In some embodiments, the fluid separation system further includes a fluid coalescence device positioned between any two adjacent walls of the one or more walls.

In some embodiments, the first fluid is oil, the second fluid is water, and the third fluid is gas.

In some embodiments, the outlet is a first outlet at which the first fluid can exit the container, and the one or more walls are arranged to further guide the first internal fluid streams and the second internal fluid streams towards a second outlet of the container at which the second fluid can exit the container.

In some embodiments, the one or more walls are arranged to further guide the first internal fluid streams and the second internal fluid streams towards a third outlet of the container at which the third fluid can exit the container.

In some embodiments, the fluid separation system is configured to be retrofitted to the container.

In another aspect, a method of separating fluids within a container includes receiving an incoming fluid stream including a first fluid, a second fluid, and a third fluid at an inlet pipe arranged within the container and separating the incoming fluid stream into first internal fluid streams and second internal fluid streams within the container respectively at first and second distribution components of a fluid distribution device coupled to the inlet pipe. The first internal fluid streams and the second internal fluid streams each include the first fluid, the second fluid, and the third fluid. The method further includes separating the first fluid, the second fluid, and the third fluid of the first internal fluid streams and the second internal fluid streams from one another upstream of an outlet of the container and guiding the first internal fluid streams and the second internal fluid streams along one or more walls arranged within the container towards the outlet of the container.

Embodiments may provide one or more of the following features.

In some embodiments, the first and second distribution components respectively have first and second structural configurations that are mirrored with respect to each other.

In some embodiments, the method further includes guiding the first internal fluid stream in a first bulk direction along multiple first fins of the first fluid distribution component and guiding the second internal fluid stream in a second bulk direction that is opposite the first bulk direction along multiple second fins of the second fluid distribution component.

In some embodiments, the method further includes changing a flow direction of the incoming fluid stream by about 90 degrees at the fluid distribution device.

In some embodiments, the method further includes staggering an arrangement of the one or more walls within the container and flowing the first internal fluid streams and the second internal fluid streams along a serpentine flow path defined by the arrangement of the one or more walls.

In some embodiments, the first fluid is oil, the second fluid is water, and the third fluid is gas.

In some embodiments, the method further includes retrofitting the fluid distribution device and the one or more walls to the container.

The details of one or more embodiments are set forth in the accompanying drawings and description. Other features, aspects, and advantages of the embodiments will become apparent from the description, drawings, and claims.

DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
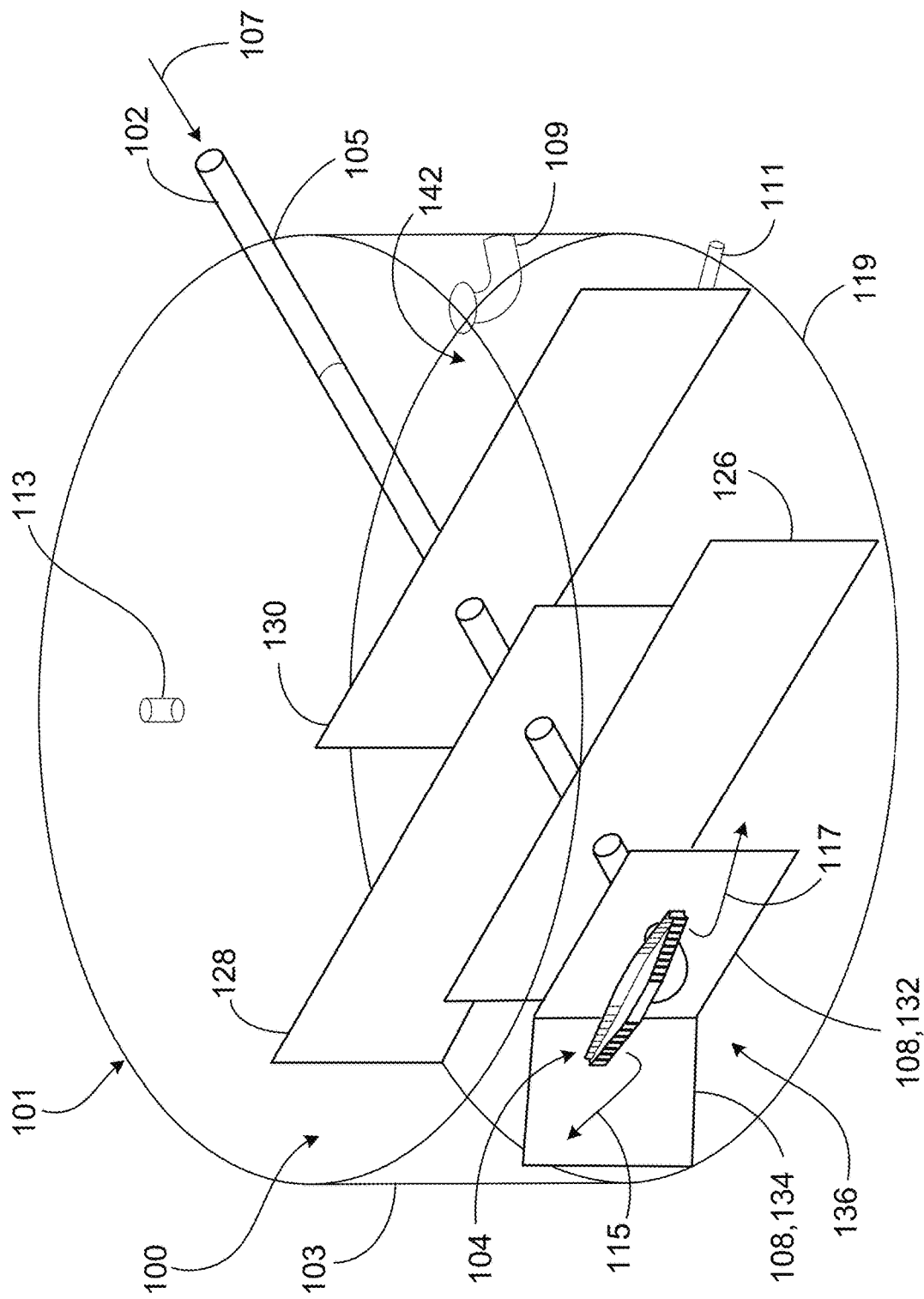
FIG. 1 is a perspective view of an example fluid separation system within an example processing tank.

FIG. 1 illustrates a fluid separation system 100 within a processing tank 101 at a crude oil production facility. In some embodiments, the processing tank 101 is a low pressure degassing tank (LPDT) that operates at or above atmospheric pressure and includes a cylindrical wall 103 that surrounds the fluid separation system 100. The processing tank 101 includes an inlet nozzle 105 at which an incoming fluid stream 107 is delivered to the processing tank 101. The incoming fluid stream 107 is a three-phase fluid mixture of crude oil, water, and gas. The processing tank 101 further includes an oil outlet nozzle 109, a water outlet nozzle 111, and a gas outlet nozzle 113. The fluid separation system 100 is designed to separate water and gas from the incoming fluid stream 107. The fluid separation system 100 includes an inlet pipe 102 that extends from the inlet nozzle 105 of the processing tank 101, a fluid distribution device 104 disposed at a curved end 106 of the inlet pipe 102, and multiple walls that are strategically located to guide separated internal fluid streams 115, 117 flowing from the fluid distribution device 104.

The inlet pipe 102 extends across the processing tank 101 along a central axis 138 of the processing tank 101 through the multiple walls at a height that is relatively close to a bottom wall 119 of the processing tank 101. For example, the processing tank 101 typically has a height H of about 10 meters (m) to about 20 m, and the inlet pipe 102 is typically positioned at a height of about ⅓H from the bottom wall 119 of the processing tank 101. In some embodiments, the inlet pipe 102 has a diameter of about 1.2 m. The processing tank 101 typically has a diameter D of about 25 m to about 50 m. The inlet pipe 102 is typically made of one or more materials that can withstand the harsh chemical characteristics of the incoming fluid stream 107, such as carbon steel that is coated with a chemically-resistant paint or other surface treatment. The processing tank 101 is typically made of carbon steel.

Figure 2:
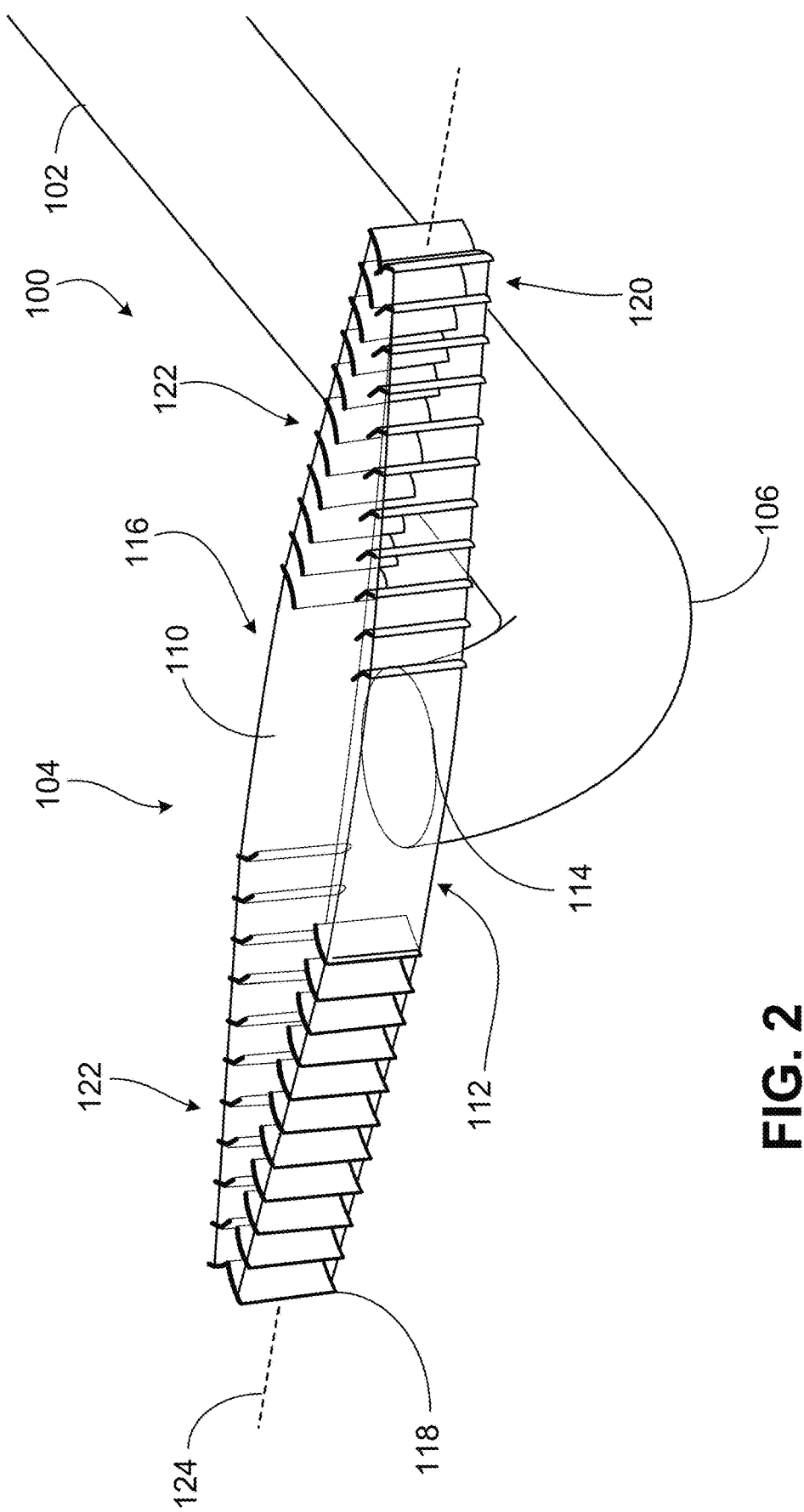
FIG. 2 is an enlarged perspective view of a fluid distribution device of the fluid separation system of FIG. 1.

Referring to FIG. 2, the fluid distribution device 104 is a twinned inlet distributor device (TIDD) that separates the incoming fluid stream 107 exiting the inlet pipe 102 into a first collection of multiple internal fluid streams 115 and a second collection of multiple internal fluid streams 117. The multiple internal fluid streams 115 are represented by a single arrow 115 oriented in a first bulk direction in FIG. 1, while the multiple internal fluid streams 117 are represented by a single arrow 117 oriented in a second, opposite bulk direction in FIG. 1. The fluid distribution device 104 primarily functions to cause gas disengagement. That is, the fluid distribution device 104 causes gas to separate from liquid (for example, crude oil and water) within the incoming fluid stream 107. The fluid distribution device 104 includes a top wall 110, a bottom wall 112 that opens to the curved end 106 of the inlet pipe 102, and two opposing central walls 114. The top wall 110, the bottom wall 112, and the central walls 114 together define a central hub 116 that receives the incoming fluid stream 107 from the inlet pipe 102. The fluid distribution device 104 also includes two oppositely directed sets (for example, mirrored sets) of fins 118 defining openings 120 therebetween through which fluid can exit the fluid distribution device 104 as the internal fluid streams 115, 117. The top wall 110, the bottom wall, 112, and the fins 118 together define distributor modules 122 that extend in opposite directions from the central hub 116 to direct the internal fluid streams 115, 117 to opposite sides of the processing tank 101.

The fins 118 in each distributor module 122 have a curved shape and are centrally oriented at an angle in a range of about 15 degrees to about 65 degrees from a long axis 124 of the fluid distribution device 104, where the angle of orientation of the fins 118 in one distributor module 122 are oriented at an absolute value of the angle of orientation of the fins 118 in the other distributor module 122. For example, in some embodiments, leading edges of the fins 118 may be oriented at an angle of about 20 degrees with respect to the long axis 124, while trailing edges of the fins 118 may be oriented at an angle of about 50 degrees with respect to the long axis 124. Each distributor module 122 has a generally triangular cross-sectional shape. The fluid distribution device 104 is oriented perpendicular to the inlet pipe 102 such that the incoming fluid stream 107 undergoes a change in flow direction within the processing tank 101. The change in flow direction provided by such a configuration increases centrifugal forces acting on gas and liquid within the incoming fluid stream 107 that turns to enter the fluid distribution device 104, thus facilitating improved gas-liquid separation of the incoming fluid stream 107 as the incoming fluid stream 107 enters the processing tank 101.

The fluid distribution device 104 has a total length of about ¼D and a maximum width of about 115% to about 125% of the diameter of the inlet pipe 102. Areas of the openings 120 and a cross-sectional area of the inlet pipe 102 define flow-through areas for the incoming fluid stream 107. A sum of the areas provided by all of the openings 120 is greater (for example, from five to seven times greater) than the cross-sectional area of the inlet pipe 102, which advantageously causes a reduction in a flow velocity of the incoming fluid stream 107. For example, in some embodiments, a total area of the openings 120 is about 5.5 times greater than the cross-sectional area of the inlet pipe 102. The fluid distribution device 104 is typically made of one or more materials, such as carbon steel, stainless steel, and a nickel-molybdenum alloy.

Use of the fluid distribution device 104 embodied as a TIDD imparts several benefits to the process of dewatering crude oil within the processing tank 101. For example, the fluid distribution device 104 decelerates the incoming fluid stream 107 and helps the incoming fluid stream 107 to pool at low speed to avoid disturbing pre-existing laminar flow patterns within the processing tank 101. Splitting the incoming fluid stream 107 at the fluid distribution device 104 also reduces the momentum of the internal fluid streams 115, 117.

Another advantage of the fluid separation system 100 is that the fluid distribution device 104 releases the incoming fluid stream 107 near the cylindrical wall 103 of the processing tank 101 as opposed to a central region of the processing tank 101, where conventional header-riser type flow distribution devices release an incoming fluid stream 107. The fluid distribution device 104 is also located as far as possible from the oil and water outlet nozzles 109, 111 to maximize residence time for oil-water separation. Release of the incoming fluid stream 107 into the internal fluid streams 115, 117 at the cylindrical wall 103 directs the internal fluid streams 115, 117 to spread out from the fluid distribution device 104 in a decelerated pattern for degassing of the internal fluid streams 115, 117. The internal fluid streams 115, 117 are guided in a manner that lengths and time durations of their flow paths are maximized to achieve uniform residence times of water and oil phases within the processing tank 101 to promote efficient separation of oil and water from each other. Additionally, the fluid distribution device 104, embodied as a TIDD, reduces droplet shearing and prevents generation of small size droplets. Reduction of the number of small droplets improves oil-water liquid separation within the processing tank 101.

Figure 3:
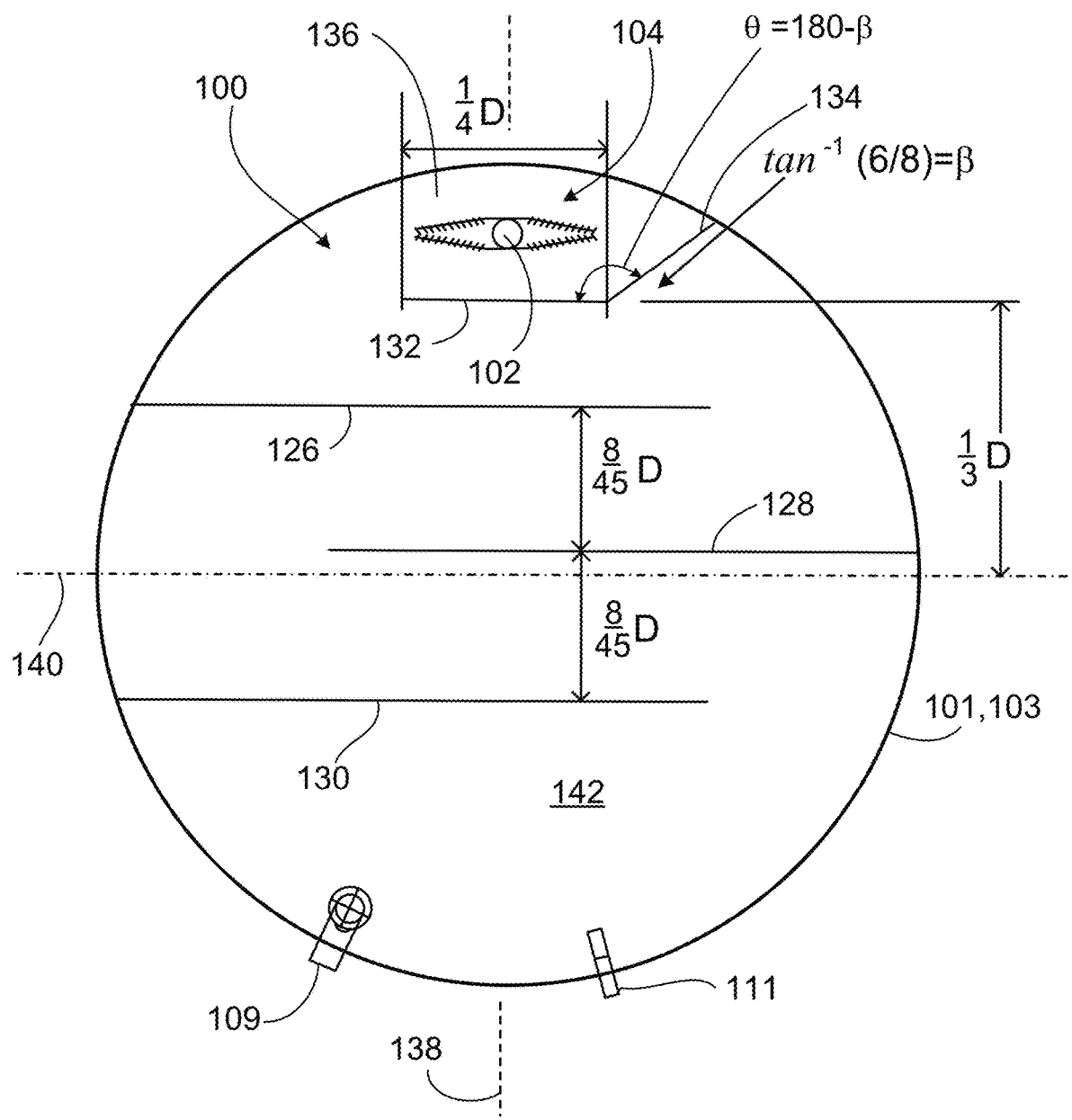
FIG. 3 is a top cross-sectional view of the fluid separation system within the processing tank of FIG. 1.

Referring to FIG. 3, the walls of the fluid separation system 100 are non-perforated baffles that are positioned in a staggered arrangement to smoothly direct the internal fluid streams 115, 117 towards the oil outlet nozzle 109 and the water outlet nozzle 111 of the processing tank 101 in a serpentine flow pattern. The walls include an inlet wall 108 and interior walls 126, 128, 130 through which the inlet pipe 102 passes across the processing tank 101. The inlet wall 108 includes a main portion 132 and a lateral portion 134 that extends at an obtuse angle θ from the main portion 132 to the cylindrical wall 103 of the processing tank 101. The inlet wall 108 and the cylindrical wall 103 thus together form an inlet zone 136 within the processing tank 101 from which the internal fluid streams 115, 117 flow away from the fluid distribution device 104. Furthermore, the interior wall 130 and the cylindrical wall 103 together form an outlet zone 142 within the processing tank 101 in which the internal fluid streams 115, 117 flow towards the oil outlet nozzle 109 and the water outlet nozzle 111.

In some embodiments, the walls 108, 126, 128, 130 of the fluid separation system 100 have a height of about H/2. In some embodiments, the main portion 132 of the inlet wall 108 has a length of about D/4 and is centered on the central axis 138 of the processing tank. In some embodiments, the main portion 132 of the inlet wall 108 is positioned at a distance of about D/3 from a central axis 140 of the processing tank 101, where the central axis 140 is perpendicular to the central axis 138. In some embodiments, the interior walls 126, 128, 130 have a length of about 2πD/9. In some embodiments, the interior walls 126, 128, 130 are spaced apart from each other by a distance of about 8D/45.

Use of the staggered walls 108, 126, 128, 130 imparts several benefits to the process of dewatering crude oil within the processing tank 101. For example, the walls 108, 126, 128, 130 streamline the internal fluid streams 115, 117 into the serpentine flow pattern, minimize pockets of eddies in the liquid flow, and minimize intermixing of the oil and water phases, thereby reducing the time that it takes for droplets to travel to the oil-water interface. The walls 108, 126, 128, 130 also narrow the residence time distribution of the oil and water liquid phases within the processing tank 101, which in turn helps to coalesce droplets of the phases for better separation. The residence time is a measure of the average time that a molecule of liquid spends in a reservoir. For a steady state system, such as the fluid separation system 100 within the processing tank 101, the average residence time is the volume of the processing tank 101 divided by an input flow rate of the incoming fluid stream 107. Therefore, the residence time increases as the flow rate decreases and decreases as the flow rate increases. The fluid separation system 100 affects the residence time distribution such that a maximum quantity of parcels of input fluids (for example, oil and water) arrive at the respective oil and water nozzle outlets 109, 111 close to the average residence time. The residence times are increased for faster flowing parcels of oil and water and decreased for slower flowing parcels of oil and water, where a parcel can be considered as an infinitesimally small part of the fluid continuum. The fluid separation system 100 reduces the standard deviation and variance of the residence time distribution. The walls 108, 126, 128, 130 also promotes efficient utilization of the volume of the processing tank 101 with minimal dead zones and improves separation of oil from water and gas from water by increasing the residence time distribution of each phase.

Furthermore, inclusion of the inlet wall 108 produces a relatively less chaotic flow pattern towards the first interior wall 126 and improves the residence time distribution and oil-water separation. The staggered pattern of the walls 108, 126, 128, 130 converts a cylindrical volume of the processing tank 101 into a rectangular cross-sectional flow-through area.

Figure 4:
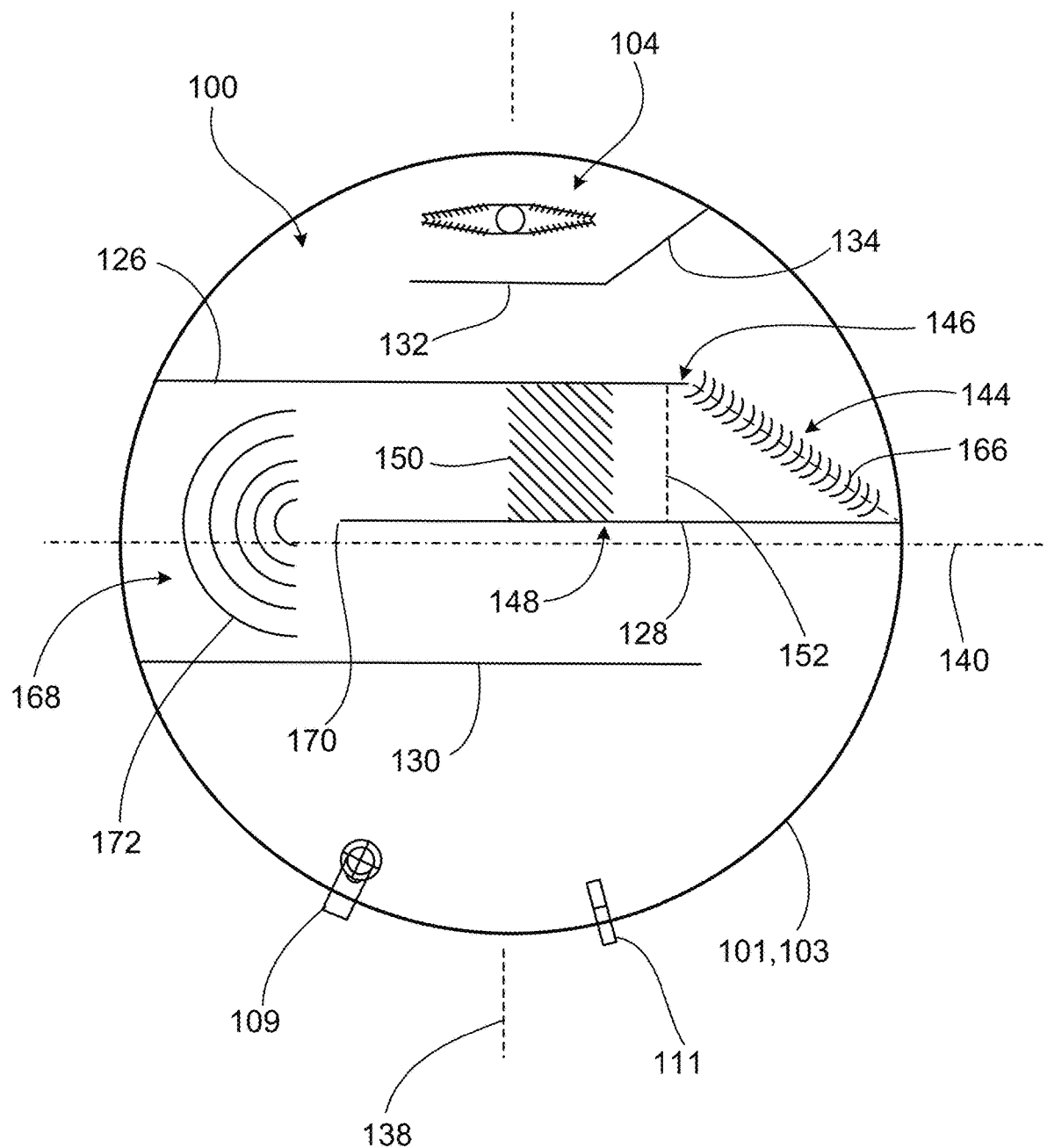
FIG. 4 is a top cross-sectional view of the fluid separation system within the processing tank of FIG. 1, including additional system components.

In some embodiments, the fluid separation system 100 further includes one or more flow turning vanes respectively installed at a free end of one or more of the interior walls (for example, an end that is unattached to the cylindrical wall 103 and around which the internal fluid streams 115, 117 can flow). Such turning vanes are designed to minimize turbulent eddies, and shearing in the internal fluid streams 115, 117 that may develop due to 180 degree changes in flow direction at the free ends of the walls 126, 128, 130. For example, FIG. 4 illustrates a first type of flow turning vane 144 installed at a free end 146 the interior wall 126. The flow turning vane 144 extends between the free end 146 and the cylindrical wall 103 and includes a linear arrangement of flow guides 166. The flow guides 166 have a curved shape that helps the internal fluid streams 115, 117 to change direction around the free end 146 of the interior wall 126. In the example embodiment of FIG. 4, a second type of flow turning vane 168 is also installed at a free end 170 of the interior wall 128. The flow turning vane 168 includes a set of concentrically arranged semi-circular guides 172 whose shape helps the internal fluid streams 115, 117 to change direction around the free end 170 of the interior wall 128.

In some embodiments, the fluid separation system 100 also includes one or more coalescence devices installed between any two adjacent interior walls 126, 128, 130. Such coalescence devices are designed to enhance coalescence of water droplets to improve gravity separation of the water from the oil within the processing tank 101. For example, FIG. 4 also illustrates a coalescence device 148 that is positioned between and extends between the interior wall 126 and the interior wall 128. The coalescence device 148 may include a coalescer plate pack 150 and a perforated plate 152 that evenly distributes the internal fluid streams 115, 117 towards the coalesce plate pack 150. In some embodiments, the coalescence device 148 is an electrostatic coalescence device.

Figure 5:
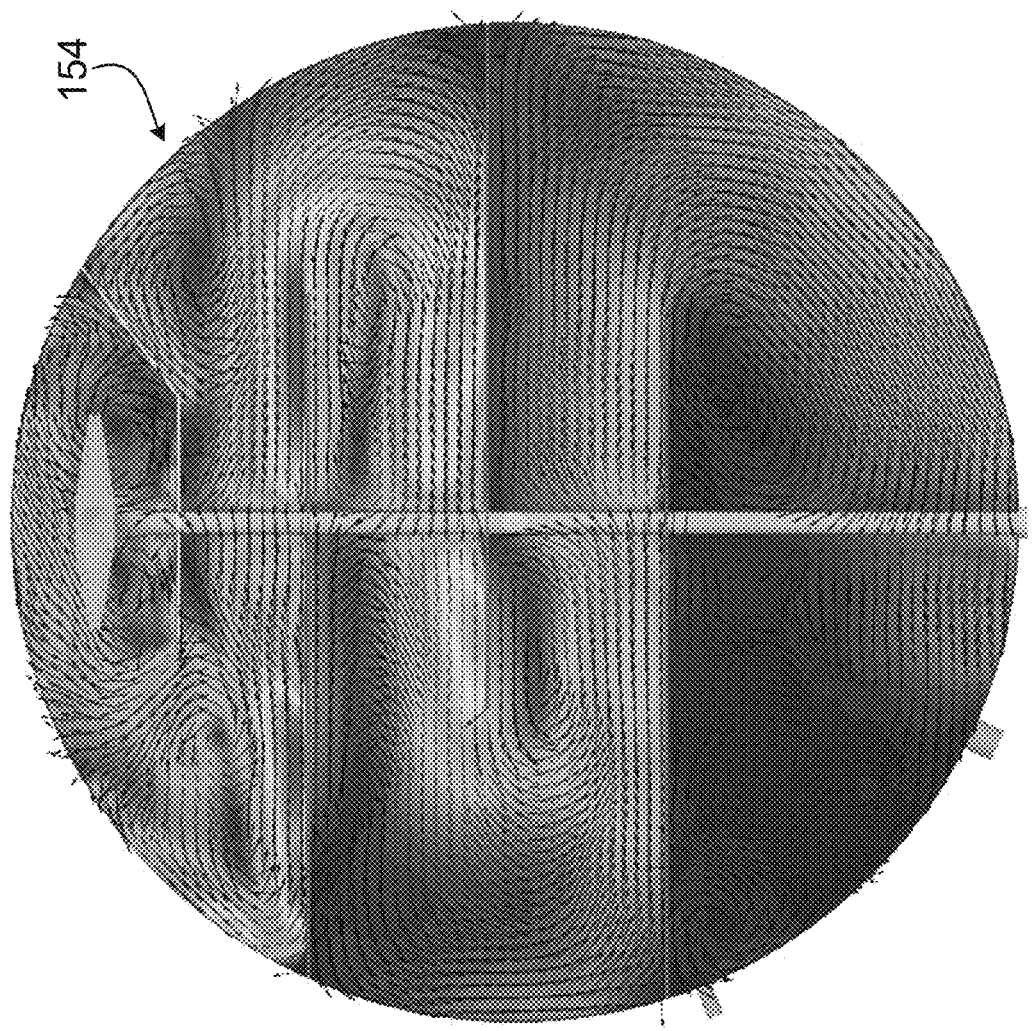
FIG. 5 is a velocity contour plot of fluid flow within the processing tank equipped with the fluid separation system of FIG. 1.

FIG. 5 illustrates a velocity contour plot 154 of a computational fluid dynamics (CFD) study that characterizes flow within the processing tank 101 equipped with the fluid separation system 100. The contour of velocity is overlaid with velocity vectors plotted as arrows on a plane that is positioned 5 m above the bottom wall 119 of the processing tank 101. For example, the velocity vector arrows illustrate the direction and movement of liquid phases in the plane positioned 5 m above the bottom wall 119. The velocity vector arrows illustrate how the staggered arrangement of the walls 108, 126, 128, 130 direct the internal fluid streams 115, 117 around the walls 108, 126, 128, 130 towards the oil outlet 109.

Figure 6:
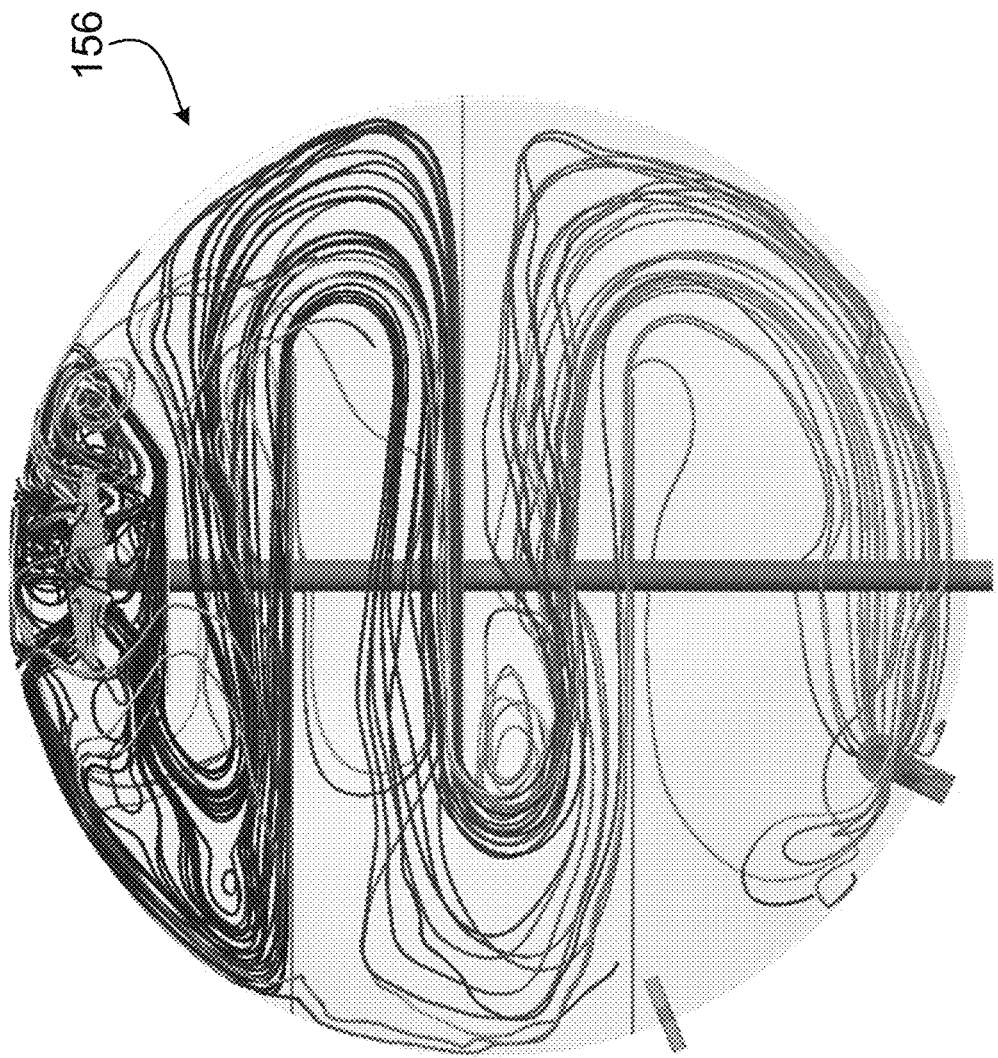
FIG. 6 is a two-dimensional streamline plot of fluid flow within the processing tank equipped with the fluid separation system of FIG. 1.
Figure 6:
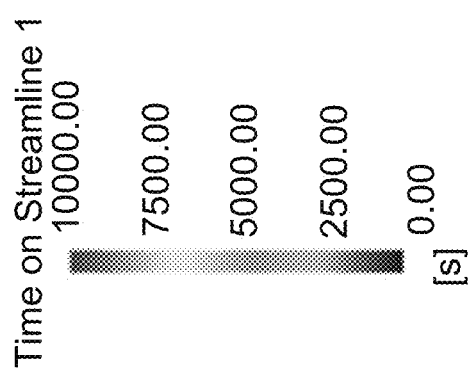

FIG. 6 illustrates a streamline plot 156 of the CFD study showing streamlines colored according to time release from the inlet nozzle 105 of the processing tank 101. The streamlines illustrate that flow patterns are relatively uniform throughout the height of the liquid in the processing tank 101, which is in large part due to flow control imparted by the staggered arrangement of the walls 108, 126, 128, 130 within the processing tank 101.

Figure 7:
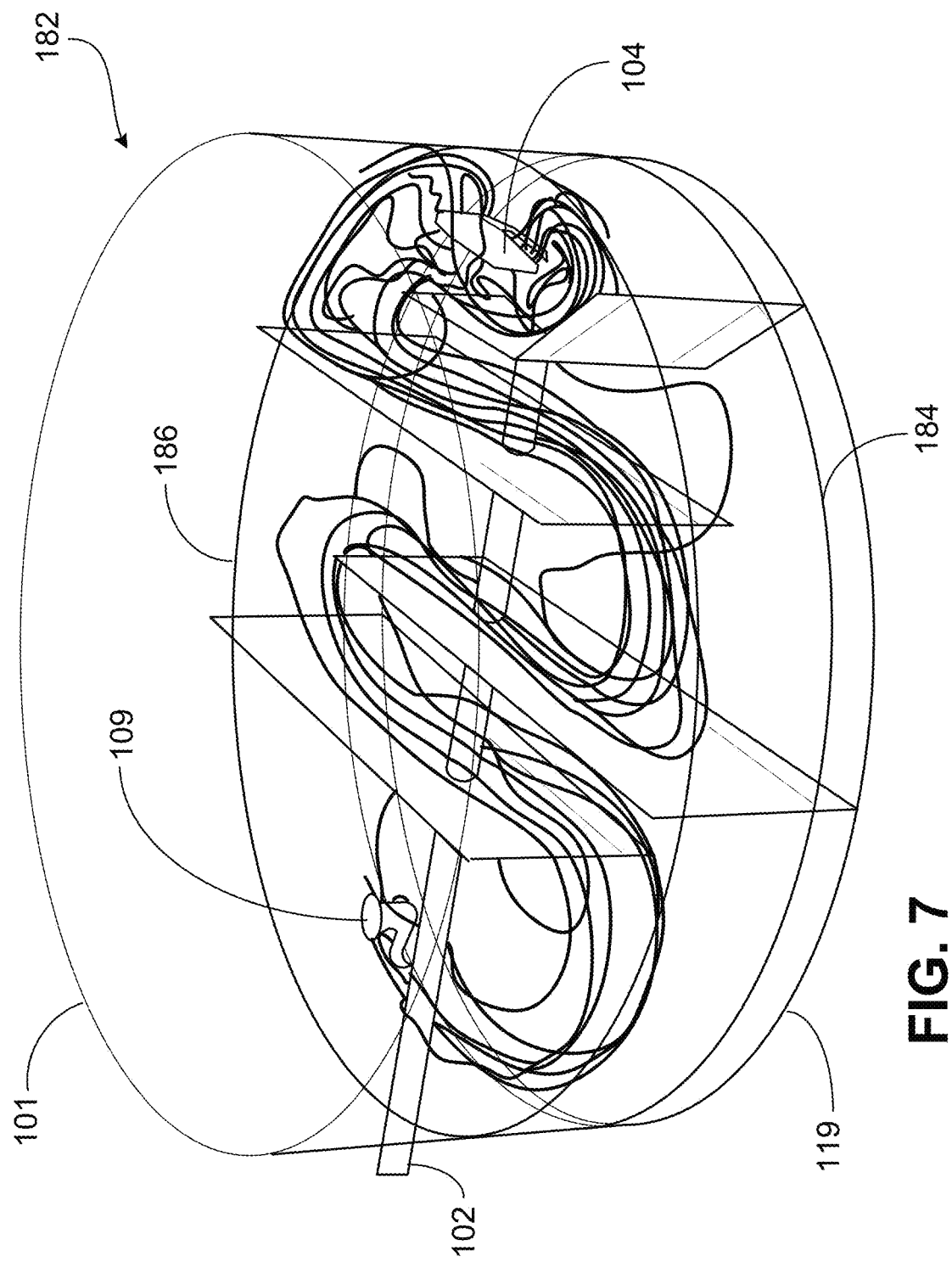
FIG. 7 is a three-dimensional streamline plot of oil flow within the processing tank equipped with the fluid separation system of FIG. 1.

FIG. 7 illustrates a three-dimensional (3D) streamline plot 182 of the CFD study showing oil components of the internal fluid streamlines 115, 117 that flow from the fluid distribution device 104 around the walls 108, 126, 128, 130 towards the oil outlet 109. Shown in the streamline plot 182 is an oil-water interface 184 and a wet crude oil surface 186. Wet crude oil (for example, crude oil and water) is present between the surface 186 and the interface 184. As the wet crude oil travels from the fluid distribution device 104 to the oil outlet 109, the water within the wet crude oil separates from the oil and settles towards the bottom wall 119 of the processing tank 101. Thus, water is present below the oil-water interface 184.

Figure 8:
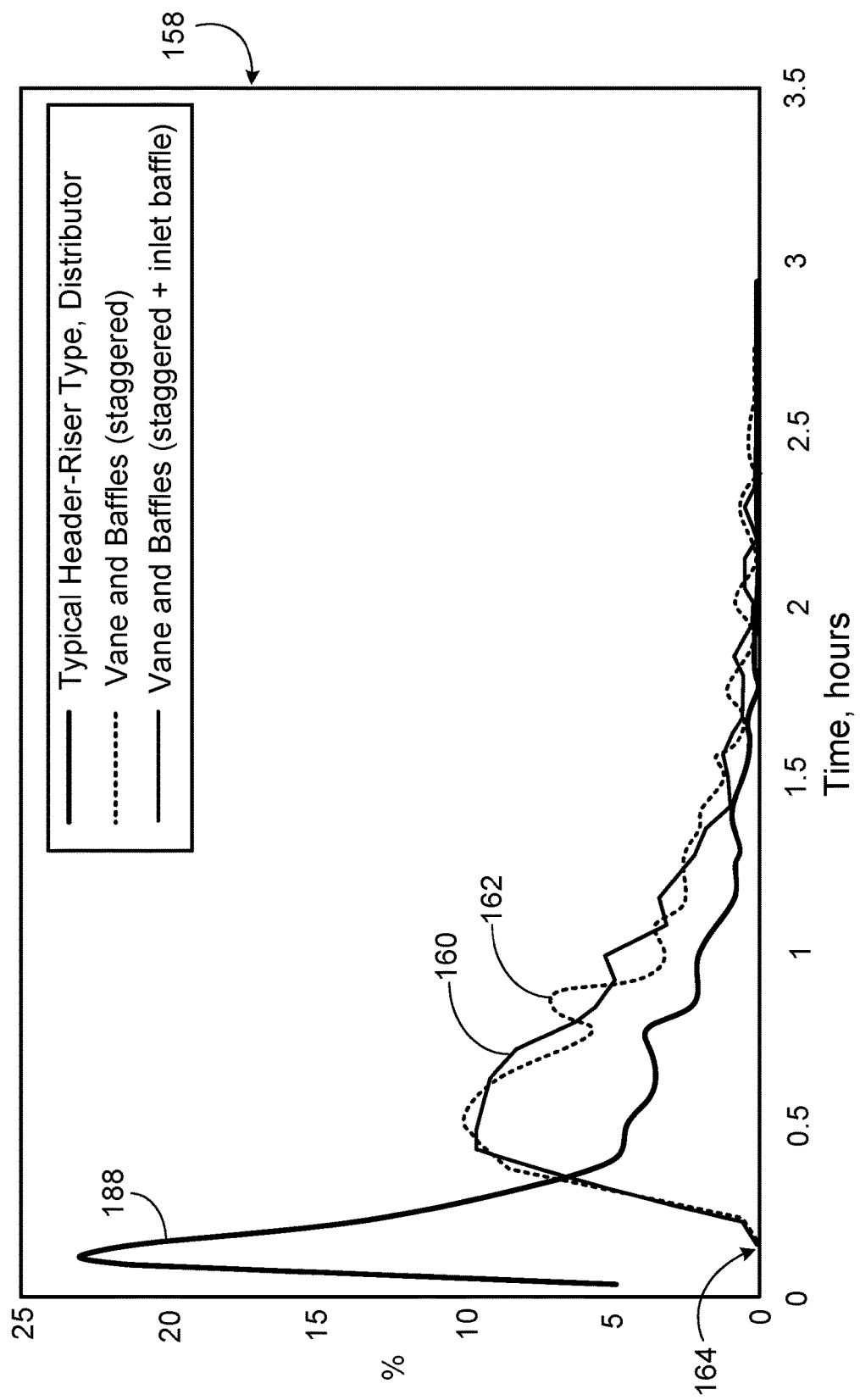
FIG. 8 is a plot of residence time distribution of water droplets within the processing tank equipped with the fluid separation system of FIG. 1 and with a header-riser type fluid distributor.

FIG. 8 illustrates a graph 158 of residence time distribution (RTD) of 200 μm sized water droplets exiting the oil outlet nozzle 109 of the processing tank 101 along with wet crude oil. A plot 160 represents the RTD with use of the fluid separation system 100. A plot 162 represents the RTD with the use a fluid separation system that is identical to the fluid separation system 100, but that does not include the inlet wall 108. A plot 188 represents the RTD with a typical header-riser type distributor. Referring to the plots 160, 162, a delayed appearance 164 of water at the oil outlet nozzle 109 indicates a relative reduction in short circuiting of flow to the oil outlet nozzle 109, as compared to fluid separation systems that include conventional header-riser types of inlet fluid distributors. For example, the fluid distribution device 104 produces a well-defined lag time before the appearance of water droplets at the oil outlet nozzle 109. In contrast, and referring to the plot 188, the conventional header shows a very early appearance of water at the oil outlet nozzle 109, indicating the short-circuiting from the inlet pipe 102 to the oil outlet nozzle 109, thereby resulting in less time for separation (for example, settling) of the water droplets. Furthermore, the plot 160 shows that adding the inlet wall 108 reduces variability in the distribution and improves separation without affecting a degassing performance of the processing tank 101. Referring again to the plots 160, 162, utilizing the fluid distribution system 100 reduces the RTD, as evidenced by a later minimum time (for example, initial time) and a sooner maximum time (for example, final time).

The fluid separation system 100 can be retrofitted within a processing tank 101 to replace a conventional header-riser type of fluid distributor within the processing tank 101 at a low cost. In some examples, CFD studies carried out to evaluate a performance of the fluid separation system 100 have shown efficient separation of gas within the processing tank 101, gradual reduction of momentum within the internal fluid streams 115, 117, a steady liquid flow regime of the internal fluid streams 115, 117, and narrower (for example, less spread) residence time distributions for both oil and water phases within the processing tank 101. The fluid separation system 100 has also been shown to increase water separation from crude oil within the processing tank 101 by 28%, as compared to the water separation achieved by conventional header-riser type fluid distributors. In addition to improving a quality of crude oil (for example, as defined by the amount of water in the crude oil) produced at the oil outlet nozzle 109 of the processing tank 101, the fluid separation system 100 has also been shown to improve a quality of water (for example, as defined by the amount of oil in the water) produced at the water outlet nozzle 111 of the processing tank 101.

Furthermore, the fluid separation system 100 minimizes phase velocities at the outlet nozzles 109, 111 to minimize intermixing of the phases and short-circuiting of oil and water. The fluid separation system 100 has also been shown to avoid chronic vibration in the inlet pipe 102, which plagues inlet pipes for conventional header-riser type fluid distributors within a processing tank due to slug flow in three-phase crude oil received from upstream gas-oil separators. Improved dewatering of the crude oil by the fluid separation system 100 can eliminate the need for additional equipment (for example, a dehydrator equipment) located downstream of the processing tank 101 for further processing of wet crude oil exiting the oil outlet nozzle 109 or may eliminate actions for removing bottlenecks from other downstream equipment (for example, a crude heater, a dehydrator, and a de-salter) that may otherwise be negatively impacted by low quality, high water content, crude oil.

Figure 9:
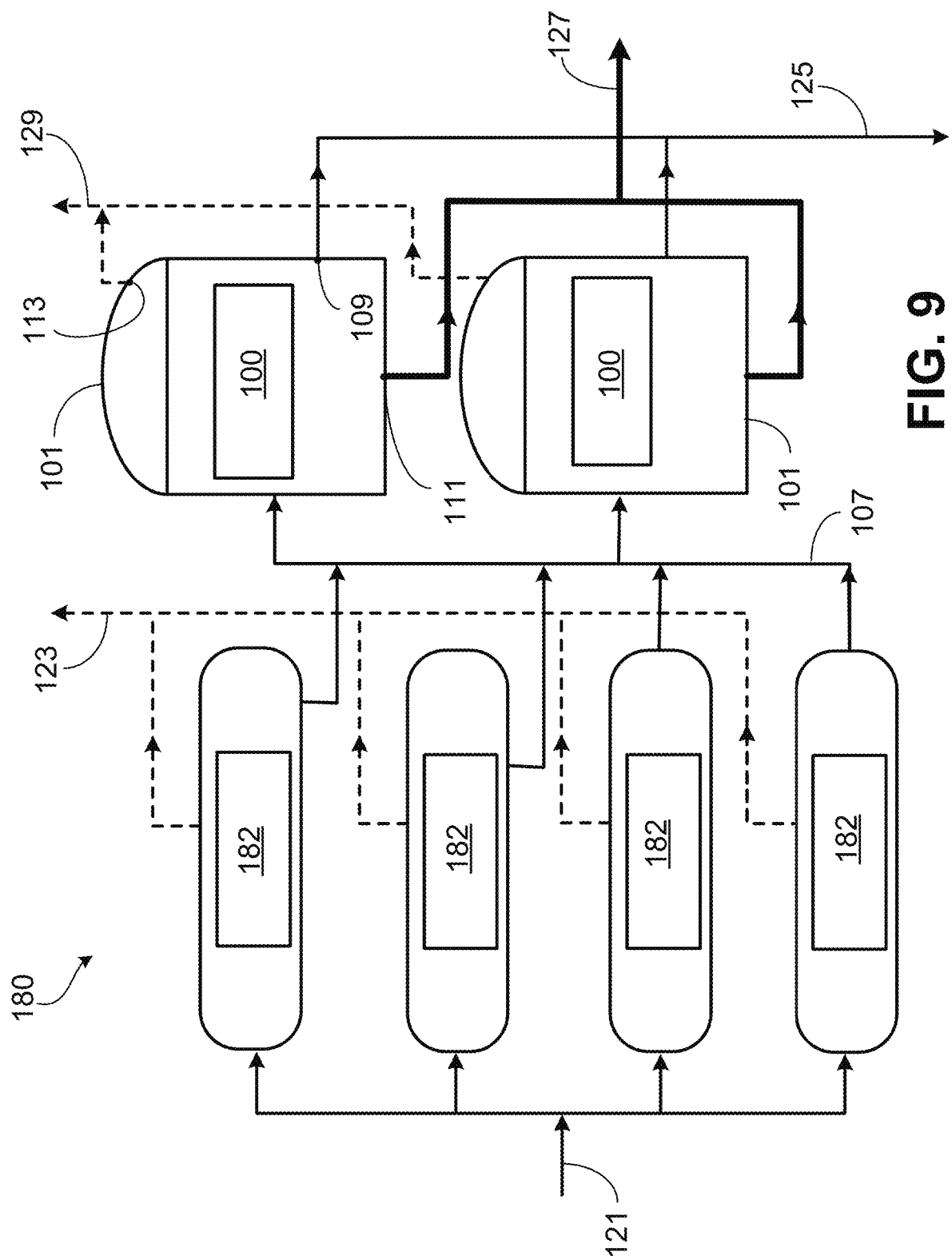
FIG. 9 is a schematic illustration of a production system including processing tanks equipped with fluid separation systems of FIG. 1.

FIG. 9 illustrates a production system 180 that includes processing tanks 101 equipped with the fluid separation system 100 at a production facility. The production system 180 also includes multiple low pressure production traps (LPPTs) 182 that are located upstream of the processing tanks 101 and that receive heavy and medium crude oil 121 from wellheads. The LPPTs 182 yield low pressure gas 123 for transport to compressors and the fluid stream 107 for transport to the processing tanks 101. As discussed above, the processing tanks 101 yield wet crude oil 125 at oil outlet nozzles 109 for delivery to an oil treatment facility for further dehydration, produced water 127 at the water outlet nozzles 111 for delivery to a water treatment facility, and atmospheric gas 129 at gas outlet nozzles 113 for delivery to compressors.

Figure 10:
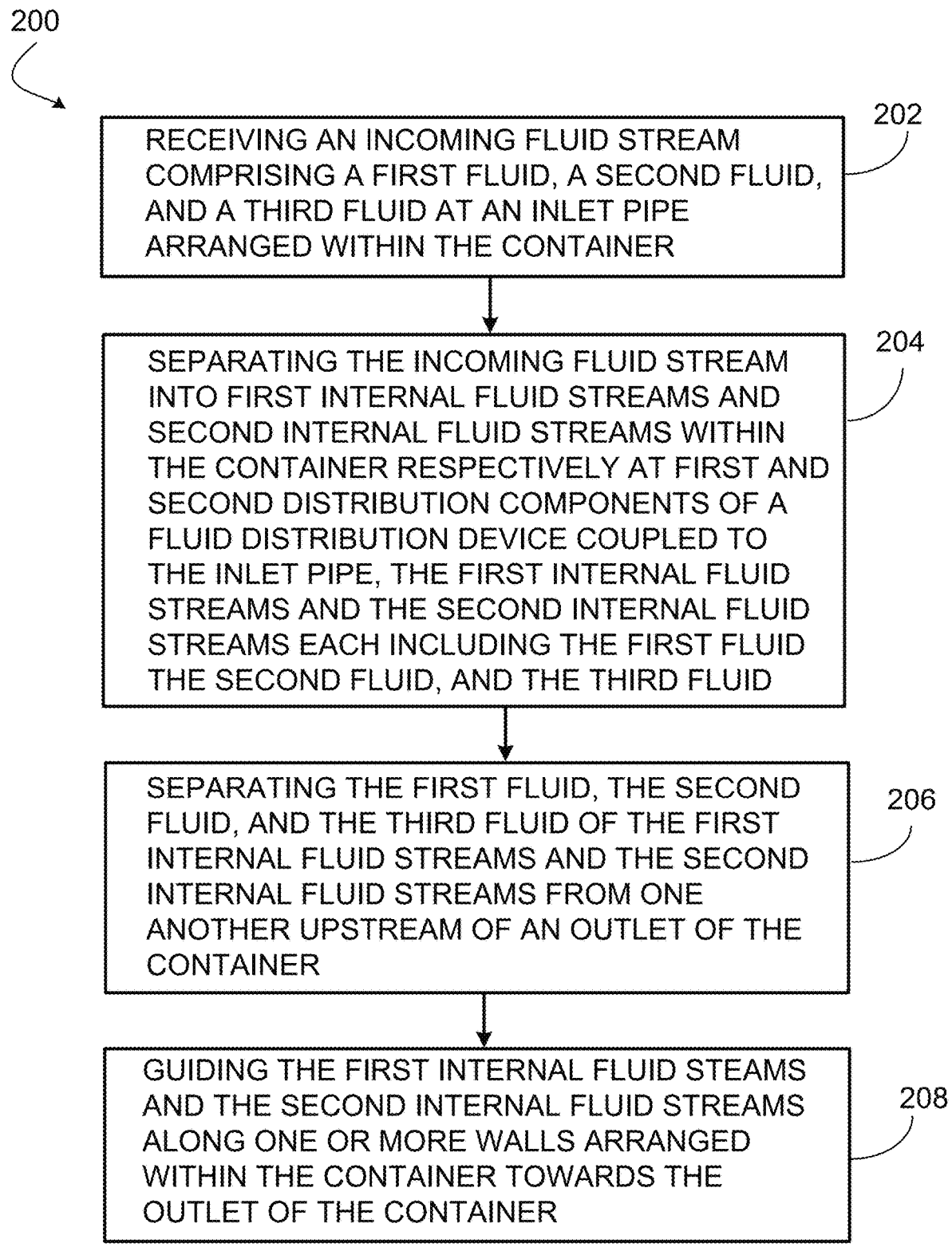
FIG. 10 is a flow chart illustrating an example method of separating fluids within a container equipped with the fluid separation system of FIG. 1.

FIG. 10 is a flow chart illustrating an example method 200 of separating fluids within a container (for example, the processing tank 101). In some embodiments, the method 200 includes receiving an incoming fluid stream (for example, the incoming fluid stream 107) including a first fluid (for example, crude oil), a second fluid (for example, water), and a third fluid (for example, gas) at an inlet pipe (for example, the inlet pipe 102) arranged within the container (202). In some embodiments, the method 200 further includes separating the incoming fluid stream into first internal fluid streams (for example, the internal fluid streams 115) and second internal fluid streams (for example, the internal fluid streams 117) within the container respectively at first and second distribution components (for example, the distributor modules 122) of a fluid distribution device (for example, the fluid distribution device 104) coupled to the inlet pipe, the first internal fluid streams and the second internal fluid streams each including the first fluid, the second fluid, and the third fluid (204). In some embodiments, the method 200 further includes separating the first fluid, the second fluid, and the third fluid of the first internal fluid streams and the second internal fluid streams from one another upstream of an outlet (for example, the oil outlet nozzle 109, the water outlet nozzle 111, or the gas outlet nozzle 113) of the container (206). In some embodiments, the method 200 further includes guiding the first internal fluid streams and the second internal fluid streams along one or more walls (for example, the walls 108, 126, 128, 130) arranged within the container towards the outlet of the container (208).

Figure 11:
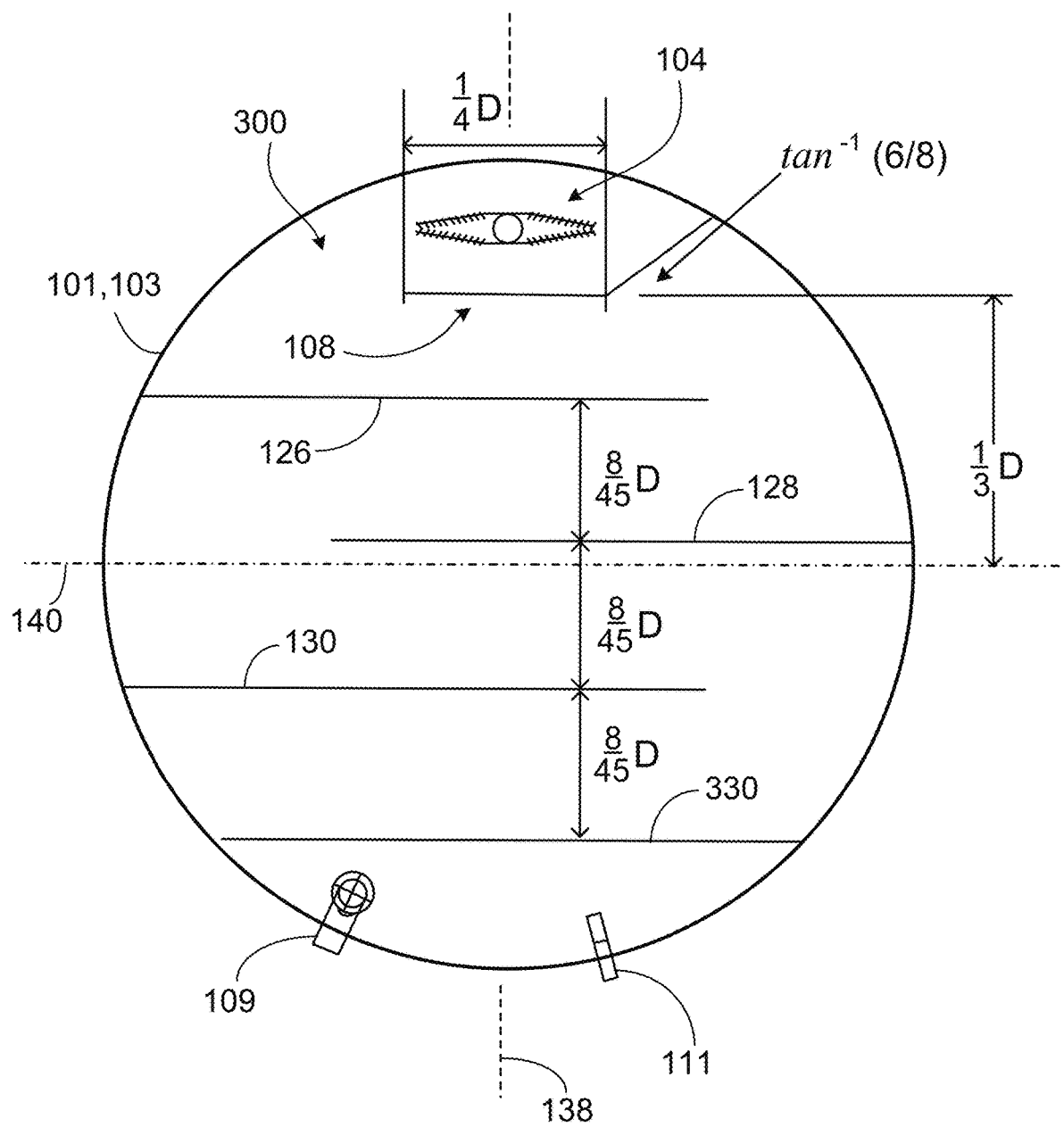
FIG. 11 is a top cross-sectional view of an example fluid separation system within the processing tank of FIG. 1.

While the fluid separation system 100 has been described and illustrated with respect to certain dimensions, sizes, shapes, arrangements, materials, methods 200, and processing tanks 101, in some embodiments, a fluid separation system that is otherwise substantially similar in construction and function to the fluid separation system 100 may include one or more different dimensions, sizes, shapes, arrangements, and materials or may be utilized according to different methods or with different tanks. For example, while the fluid separation system 100 is described and illustrated as including four walls (for example, baffles), in some embodiments, a fluid separation system that is otherwise substantially similar in construction and function to the fluid separation system 100 may include a different number of walls. FIG. 11 illustrates such a fluid separation system 300, which includes an additional wall 330 that further defines a serpentine flow pattern of the internal fluid streams 115, 117 within the processing tank 101. The fluid separation system 300 is otherwise identical to the fluid separation system 100 and accordingly includes the inlet pipe 102 (not shown), the fluid distribution device 104, the inlet wall 108, and the interior walls 126, 128, 130.

While the fluid separation system 100 has been described and illustrated with a relatively long inlet pipe 102 extending across the processing tank 101 through the walls 108, 126, 128, 130 from a side opposite the fluid distribution device 104, in some embodiments, a fluid separation system that is otherwise substantially similar in structure and function to the fluid separation system 100 may alternatively include a relatively short inlet pipe that extends from a processing tank at a same side at which the fluid distribution device 104 is positioned. Accordingly, the inlet pipe does not pass through the walls 108, 126, 128, 130 in such embodiments.

Other embodiments are also within the scope of the following claims.

What is claimed is:

1. A fluid separation system for separating fluids within a container, the fluid separation system comprising:
    an inlet pipe arranged within the container to receive an incoming fluid stream comprising a first fluid, a second fluid, and a third fluid, the inlet pipe comprising a curved end that is configured to change an incoming flow direction of the incoming fluid stream;
    a fluid distribution device coupled to the curved end of the inlet pipe and comprising first and second distribution components for respectively separating the incoming fluid stream into first internal fluid streams and second internal fluid streams within the container, the first internal fluid streams and the second internal fluid streams each including the first fluid, the second fluid, and the third fluid, wherein the first and second distribution components are oriented perpendicularly to an elongate axis of the inlet pipe to respectively guide the first internal fluid streams in a first bulk flow direction and the second internal fluid streams in a second bulk flow direction that is opposite the first bulk flow direction; and
    a plurality of walls positioned in a staggered arrangement to produce a serpentine flow path and to guide the first internal fluid streams and the second internal fluid streams along the serpentine flow path towards an outlet of the container in a bulk outflow direction that is perpendicular to the first and second bulk flow directions, wherein the plurality of walls is positioned along a length of the inlet pipe such that the inlet pipe passes through the plurality of walls, and wherein the curved end of the inlet pipe, configurations of the first and second distribution components of the fluid distribution device, and the staggered arrangement of the plurality of walls together cause the first fluid, the second fluid, and the third fluid of the first internal fluid streams and of the second internal fluid streams to separate from one another other upstream of the outlet.

2. The fluid separation system of claim 1, wherein the first and second distribution components respectively comprise first and second structural configurations that are mirrored with respect to each other.

3. The fluid separation system of claim 2, wherein the first distribution component comprises a plurality of first fins that guides the first internal fluid streams in the first bulk flow direction, and wherein the second distribution component comprises a plurality of second fins that guides the second internal fluid streams in the second bulk flow direction.

4. The fluid separation system of claim 1, wherein the fluid distribution device comprises a twinned inlet distributor device.

5. The fluid separation system of claim 1, wherein each wall of the plurality of walls extends from a lateral wall of the container to an interior region within the container.

6. The fluid separation system of claim 5, further comprising one or more flow turning devices respectively coupled to one or more free ends of the plurality of walls.

7. The fluid separation system of claim 1, further comprising a fluid coalescence device positioned between any two adjacent walls of the plurality of walls.

8. The fluid separation system of claim 1, wherein the first fluid comprises oil, wherein the second fluid comprises water, and wherein the third fluid comprises gas.

9. The fluid separation system of claim 1, wherein the outlet is a first outlet at which the first fluid can exit the container, and wherein the plurality of walls is arranged to further guide the first internal fluid streams and the second internal fluid streams towards a second outlet of the container at which the second fluid can exit the container.

10. The fluid separation system of claim 9, wherein the plurality of walls is arranged to further guide the first internal fluid streams and the second internal fluid streams towards a third outlet of the container at which the third fluid can exit the container.

11. The fluid separation system of claim 1, wherein the fluid separation system is configured to be retrofitted to the container.

12. A method of separating fluids within a container, the method comprising:

receiving an incoming fluid stream comprising a first fluid, a second fluid, and a third fluid at an inlet pipe arranged within the container;

changing an incoming flow direction of the incoming fluid stream at a curved end of the inlet pipe;

separating the incoming fluid stream into first internal fluid streams and second internal fluid streams within the container respectively at first and second distribution components of a fluid distribution device coupled to the inlet pipe, the first internal fluid streams and the second internal fluid streams each including the first fluid, the second fluid, and the third fluid, wherein the first and second distribution components are oriented perpendicularly to an elongate axis of the inlet pipe;

guiding the first internal fluid streams in a first bulk flow direction at the first distribution component and guiding the second internal fluid streams in a second bulk flow direction that is opposite the first bulk flow direction at the second distribution component; and guiding the first internal fluid streams and the second internal fluid streams along a serpentine flow path defined by a staggered arrangement of a plurality of walls within the container and towards an outlet of the container in a bulk outflow direction that is perpendicular to the first and second bulk flow directions, while guiding the first internal fluid streams and the second internal fluid streams along a length of the inlet pipe in the bulk outflow direction across the container, wherein the plurality of walls is positioned along the length of the inlet pipe such that the inlet pipe passes through the plurality of walls, and wherein the curved end of the inlet pipe, configurations of the first and second distribution components of the fluid distribution device, and the staggered arrangement of the plurality of walls together cause the first fluid, the second fluid, and the third fluid of the first internal fluid streams and of the second internal fluid streams to separate from one another other upstream of the outlet.

13. The method of claim 12, wherein the first and second distribution components respectively comprise first and second structural configurations that are mirrored with respect to each other.

14. The method of claim 13, further comprising:

guiding the first internal fluid streams in the first bulk flow direction along a plurality of first fins of the first fluid distribution component; and guiding the second internal fluid streams in the second bulk flow direction that is opposite the first bulk flow direction along a plurality of second fins of the second fluid distribution component.

15. The method of claim 12, further comprising changing the incoming flow direction of the incoming fluid stream by about 90 degrees at the curved end of the inlet pipe.

16. The method of claim 12, wherein the first fluid comprises oil, wherein the second fluid comprises water, and wherein the third fluid comprises gas.

17. The method of claim 12, further comprising retrofitting the fluid distribution device and the plurality of walls to the container.

* * * * *